UNITED STATES PATENT OFFICE.

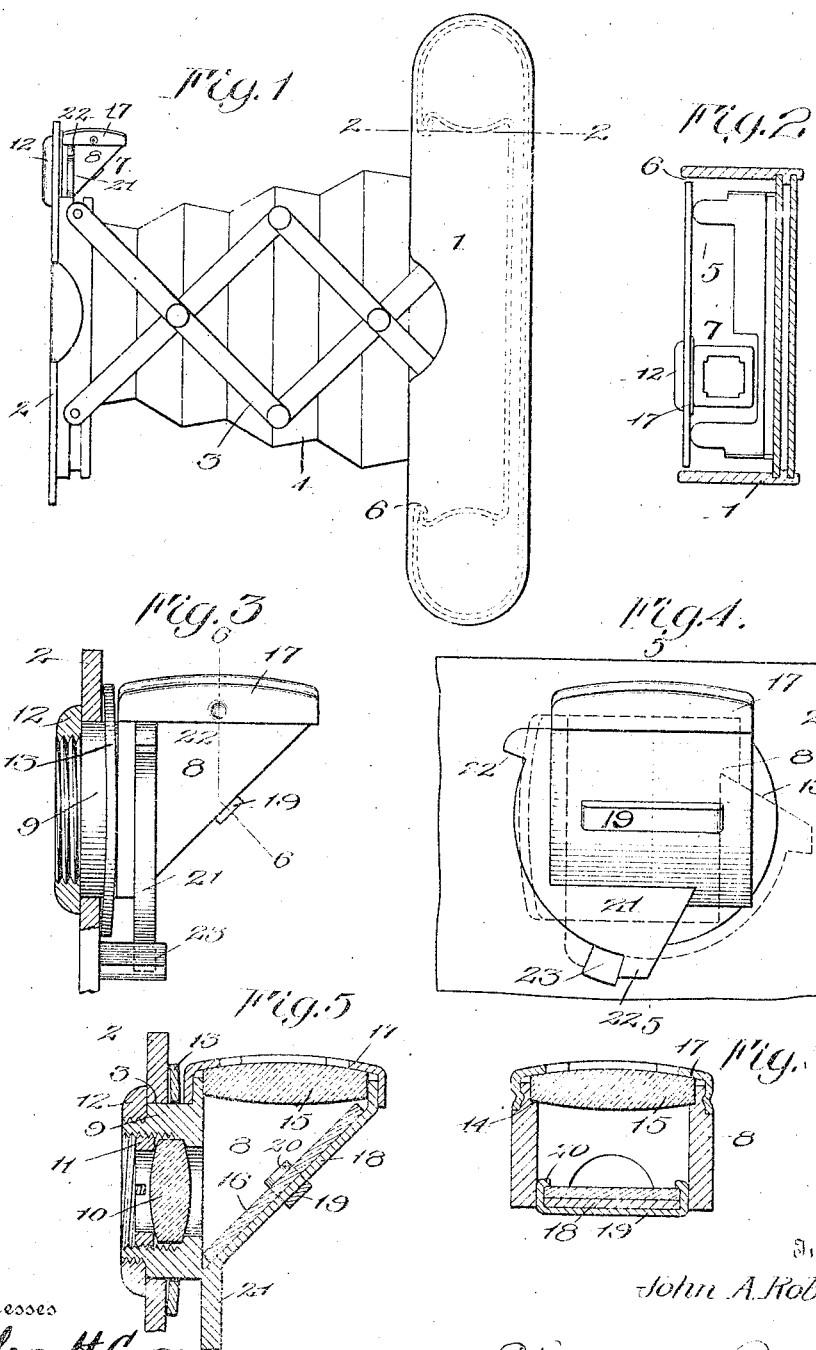

JOHN A. ROBERTSON, OF ROCHESTER, NEW YORK, ASSIGNOR TO EASTMAN KODAK COMPANY, OF ROCHESTER, NEW YORK, A CORPORATION OF NEW YORK.

VIEW-FINDER.

1,060,709. Specification of Letters Patent. Patented May 6, 1913.

Application filed March 8, 1912. Serial No. 682,391.

*To all whom it may concern:*

Be it known that I, JOHN A. ROBERTSON, of Rochester, in the county of Monroe and State of New York, have invented certain new and useful Improvements in View-Finders; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide the camera with an improved view finder which will be inconspicuous, and will be so disposed as to be well protected in both its operative and inoperative positions.

A further object of the invention is to provide a view finder of improved construction adapting it for reversal to correspond with changes in the position of the camera for the purpose of exposing the plate in both horizontal and vertical positions.

To these and other ends the invention consists in certain improvements and combinations of parts, all as will be hereinafter more fully described, the novel features being pointed out in the claims at the end of the specification.

In the drawings: Figure 1 is a side elevation of a camera provided with a view finder, constructed in accordance with and illustrating one embodiment of my invention; Fig. 2 is a section taken substantially on the line 2—2 of Fig. 1; Fig. 3 is a side elevation, partly in section, of the finder and its support; Fig. 4 is a rear elevation of the finder; Fig. 5 is a section taken substantially on the line 5—5 of Fig. 4, and Fig. 6 is a section taken substantially on the line 6—6 of Fig. 3.

Similar reference numerals throughout the several figures indicate the same parts.

The camera illustrated in the present embodiment of the invention is of the folding type and comprises a body portion 1, a front 2 having an extensible support 3 and an intermediate bellows 4. The body is provided with a bellows chamber 5, opening forwardly at 6, which opening is closed when the camera is folded by the front 2. In the practice of my invention, the view finder, indicated generally by 7 in Figs. 1 and 2, is mounted at one corner of the front 2 so that the casing or body portion thereof lies entirely in rear of the front, and thus folds to a position within the bellows chamber 5, as shown in Fig. 2, when the camera is folded, in which position the finder lens alone is visible while the casing is well protected. As to the specific construction of the finder itself, it comprises, in the present instance, the casing 8 on the front wall of which is formed a preferably integral, forwardly projecting lens tube 9 in which the objective 10 is secured in the usual or any preferred manner, as by the threaded sleeve 11. The front plate 2 is provided with a bearing or opening 3 through which the tube 9 projects and in which it is free to rotate and it is held therein by a detachable replaceable securing element that bears against the front of the support and that comprises, in the present embodiment, a ring nut 12 threaded on the tube. Interposed between the opposite or rear side of the plate 2 and the finder casing 8 is a spring washer 13 which exerts a yielding tension between the moving and fixed parts having a tendency to retain the finder in any position of adjustment to which it is rotated and to prevent lost motion. Seated on a shoulder 14 at the top of the casing 8 is the reflecting lens 15 on which the image is viewed and to which the image is reflected from the objective 10 by a mirror 16 arranged angularly to both lenses in the usual manner. The lens 15 is held to its seat, in the present instance, by a frame 17, while the mirror 16 is mounted on the inclined rear wall 18 of the casing. This wall is provided with apertures and a member 19 extending across the outside thereof has its ends 20 passed through the apertures and clenched over the edges of the mirror 16 to hold the latter in place.

The normal position of the camera in use is shown in Fig. 1, in which figure the finder is in an upright position also so that when it is desired to turn the camera on its side to apply the image of the camera lens in a different way on the plate, it is necessary that the finder be turned 90 degrees so that it will be upright in this position of the camera also, and this can be done with the present finder because of the rotatable nature of its connection with the front plate 2, as previously described. In order to define the proper position of the finder in either instance of use, the front wall of the casing 8 is provided with a flange or extension 21 having two shoulders 22, 90 degrees apart that alternately engage with a projecting abutment 23 on the plate 2. This abutment 23 simply acts as a stop to prevent the finder from being rotated too far in either case, while the spring washer 13 prevents it from moving back or away from the position that the stop defines, as before noted.

It will be observed with the construction described, the axis of movement of the finder during its change of position is coincident with the optical axis of its objective 10, and hence, in an optical sense the objective does not move and is at all times at the same distance from the center of the camera lens which is a readily recognized advantage. The finder is also so positioned on the front plate 2 that it cannot be turned to a position in which any part of it projects laterally beyond the edge of the front plate and, therefore, the camera can be folded with the finder in any position. Heretofore it has been usually necessary to fold the finder back to an initial position before closing the camera, and with such an arrangement if the operator forgets to so return it the result is likely to be that the finder is crushed against a portion of the body and damaged or broken off.

I claim as my invention:

1. The combination with a folding photographic camera comprising a body having a forwardly opening bellows chamber, a front adapted to close the chamber, means for supporting the front in projected position and a bellows connecting the front and body, of a view finder arranged on the rear face of the front so as to be within the bellows chamber when the camera is folded.

2. The combination with a folding photographic camera comprising a body having a forwardly opening bellows chamber, a front adapted to close the chamber, means for supporting the front in projected position and a bellows connecting the front and body, of a view finder rotatably mounted on the rear face of the front so as to be within the bellows chamber when the camera is folded, the axis of movement of the finder being so located as to prevent the latter from projecting beyond the edges of the front in any position of the finder.

3. In a view finder, the combination with a supporting plate having an opening therein, of a finder casing, a lens tube connected therewith and arranged to project through the opening and to rotate therein relatively to the plate and a detachable and replaceable securing member independent of the finder casing and coöperating with the tube on the opposite side of the plate.

4. In a view finder, the combination with a supporting plate having an opening therein, of a finder casing, a lens tube connected therewith and arranged to project through the opening and to rotate therein relatively to the plate, and a ring threaded on the tube on the opposite side of the plate to secure the tube in the latter.

5. In a view finder, the combination with a supporting plate having an opening therein, of a finder casing, a lens tube connected therewith and arranged to project through the opening and to rotate therein relatively to the plate, means connected to the tube and engaging the plate on the opposite side from the finder casing to hold the tube therein and yielding means acting between such movable and fixed parts for maintaining the finder in a position of adjustment.

6. In a view finder, the combination with a supporting plate having an opening therein, of a finder casing, a lens tube connected therewith and arranged to project through the opening and to rotate therein relatively to the plate, means connected to the tube and engaging the plate on the opposite side from said casing to hold the tube therein and a spring washer interposed between the finder casing and plate for maintaining the finder in a position of adjustment.

7. In a finder, the combination with a casing having the usual objective and reflecting lenses and provided with a wall arranged angularly to the axes of both lenses, said wall being provided with apertures, of a mirror mounted on said angular wall and means for securing the mirror in place comprising a member disposed across the outer side of the wall and having its ends passed through the apertures therein and clenched on the edges of the mirror.

JOHN A. ROBERTSON.

Witnesses:
H. E. STONEBRAKER,
HENRY W. HALL.